D. Lake.
Fly Trap,
Nº 53,310      Patented Mar. 20, 1866.
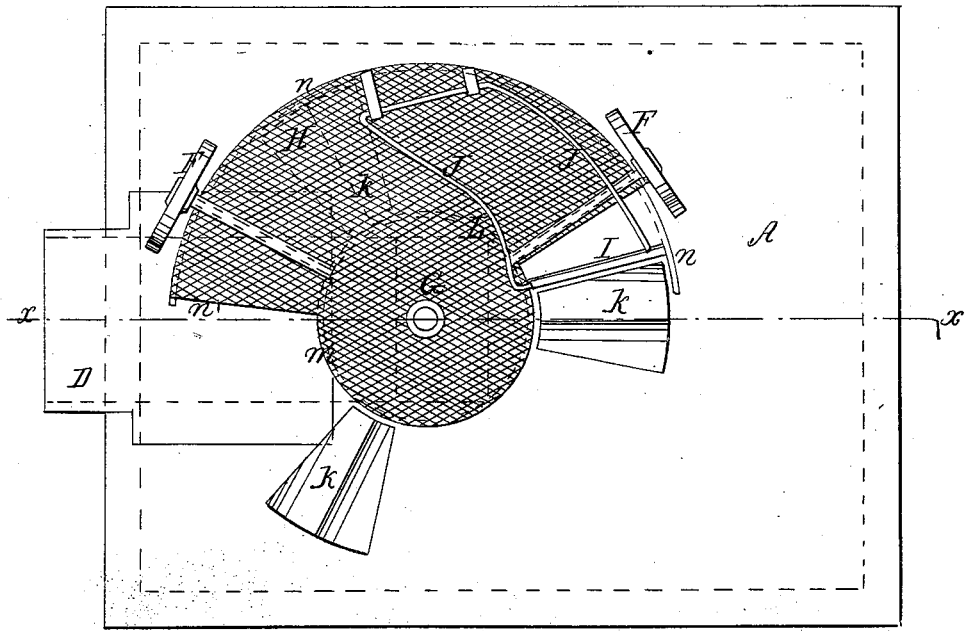
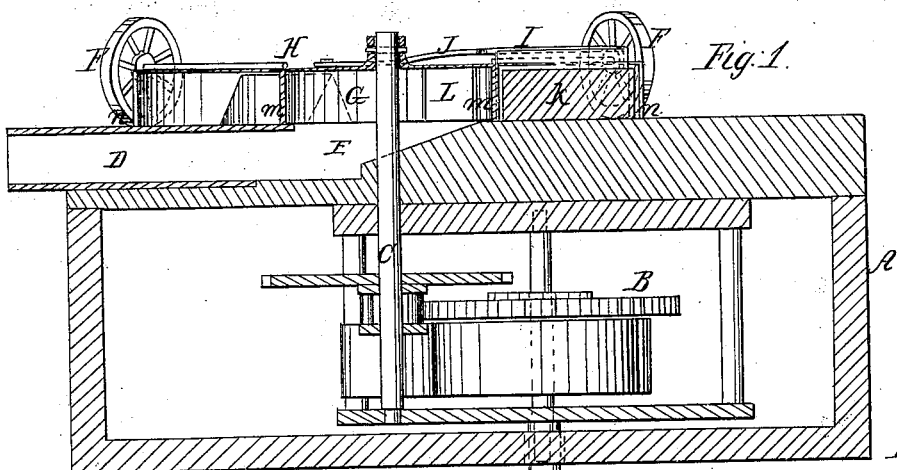
Witnesses;
Inventor;
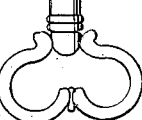

UNITED STATES PATENT OFFICE.

DAVID LAKE, OF SMITH'S LANDING, NEW JERSEY.

IMPROVEMENT IN FLY-TRAPS.

Specification forming part of Letters Patent No. 53,310, dated March 20, 1866.

*To all whom it may concern:*

Be it known that I, DAVID LAKE, of Smith's Landing, in the county of Atlantic and State of New Jersey, have invented a new and useful Improvement in Fly-Traps; and I do hereby declare that the following is a full, clear, and exact description thereof, which will enable others skilled in the art to make and use the same, reference being had to the accompanying drawings, forming part of this specification, in which—

Figure 1 is a vertical section of an apparatus made after my invention, $x$, Fig. 2, indicating the line of section. Fig. 2 is a plan.

Similar letters of reference indicate like parts.

The object of this invention is to provide a simple contrivance for getting rid of flies by entrapping them; and it consists in a moving semicircular box which is connected by a tube with any suitable receiver, in which the flies become imprisoned and from which they can be removed from time to time; or they may be destroyed while in the receiver.

A designates a case, within which is placed a system of clock-work, B, which drives the shaft C. This shaft passes through the top of the case, and is there connected to a box, G H, part of whose circumference is removed, as seen in the plan. The box rotates with the shaft C, and it is supported on the case A by means of wheels F, two or more in number. The top of the box is perforated, or else it is made of wire-gauze or other open work, to admit light within. Its side walls, however, are opaque. The central part, G, of the box is almost wholly surrounded by the wall $m$, an opening, L, being left within to permit access to the central part from the part H. One of the radial sides of the box $n'$ is open, and its circumference is inclosed by the opaque wall $n$; but its other radial side is closed by means of a gate, I, hung on springs J J.

The top of case A is cut down, as at E, about the place where the shaft C penetrates it, and the depression thus formed is connected with the inner end of a flat tube, D, whose outer end communicates with a receptacle, (not shown,) into which the insects entrapped make their way.

K K K designate double-inclined planes, placed radially in the path of the gate I at equal distances apart. The extent of the part H is greater than the distance apart of the inclined planes, from which it follows that the space between two adjacent planes will be covered by the part H when its front or open side, $n'$, has just passed one of them. The height of the planes is such that the box will clear them in its revolutions, and the gate I is free to move upward to the height of the planes.

The operation of the apparatus is as follows: The spaces between the inclined planes are supplied with a suitable substance which will attract flies or such other insects as are to be entrapped, and the spring of the clock-work is to be wound up, when the box G H will begin its revolutions. That part of the apparatus marked $n'$ is the front, and as it proceeds it covers the insects which have alighted between the planes, which insects will not be alarmed, because the upper surface of the box is perforated and permits considerable light to fall upon the case.

The gate I moves upon the surface of the case, and when it reaches a plane it rides up and over it, and is forced down again upon the surface of the case, and as it moves over the same it forces the flies to leave it and drives them through the opening L into the channel E, whence they escape through the flat pipe D into any receptacle provided for them.

I claim as new and desire to secure by Letters Patent—

In traps for flies and other insects, the combination of a revolving case moving over a plane surface with a series of inclined planes like K K upon such surface and a swinging gate placed on and following such revolving case, substantially as shown.

DAVID LAKE.

Witnesses:
SAMUEL A. MARTIN,
JOHN H. LAKE.